(12) United States Patent
Tsujihara

(10) Patent No.: US 7,603,055 B2
(45) Date of Patent: Oct. 13, 2009

(54) COVER FOR IMAGE FORMING APPARATUS TO FACILITATE PARTS RECYCLING

(75) Inventor: Sotohiro Tsujihara, Kawasaki (JP)

(73) Assignee: Ricoh Company, Limited, Tokyo (JP)

( * ) Notice: Subject to any disclaimer, the term of this patent is extended or adjusted under 35 U.S.C. 154(b) by 446 days.

(21) Appl. No.: 11/339,569

(22) Filed: Jan. 26, 2006

(65) Prior Publication Data

US 2006/0170982 A1 Aug. 3, 2006

(30) Foreign Application Priority Data

Feb. 1, 2005 (JP) ............................. 2005-024664
Sep. 28, 2005 (JP) ............................. 2005-281327

(51) Int. Cl.
*G03G 15/00* (2006.01)

(52) U.S. Cl. ..................................................... 399/109

(58) Field of Classification Search ................. 399/109, 399/124, 125
See application file for complete search history.

(56) References Cited

U.S. PATENT DOCUMENTS 5,580,019 A * 12/1996 Glesser
7,302,205 B2 * 11/2007 Shintani et al. ............. 399/125
2003/0077084 A1 * 4/2003 Cornelius
2005/0214022 A1 * 9/2005 Umeyama et al.

FOREIGN PATENT DOCUMENTS

| JP | 02093551 A | * | 4/1990 |
| JP | 06340234 A | * | 12/1994 |
| JP | 09-222763 | | 8/1997 |
| JP | 2000-307257 | | 11/2000 |
| JP | 2002-009456 | | 1/2002 |

OTHER PUBLICATIONS

Official Translation of Hoshi (JP Pub. 02-093551).*

* cited by examiner

*Primary Examiner*—David M Gray
*Assistant Examiner*—Laura K Roth
(74) *Attorney, Agent, or Firm*—Harness, Dickey & Pierce, P.L.C.

(57) ABSTRACT

A cover for use in an apparatus includes a plate and at least one rib. The plate has an inner surface, and the at least one rib is formed on the inner surface of the plate to define one or more compartments. Each compartment is configured to receive a corresponding part removed from the apparatus.

9 Claims, 8 Drawing Sheets

FIG. 5
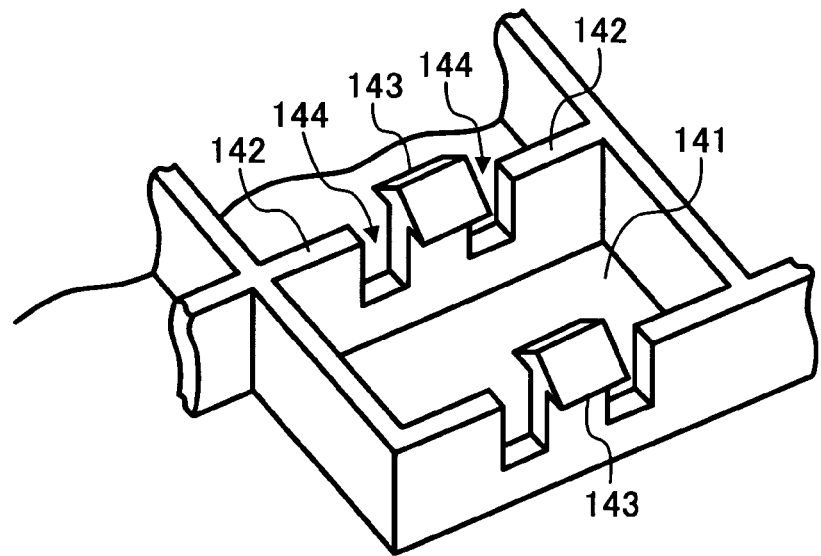
FIG. 6
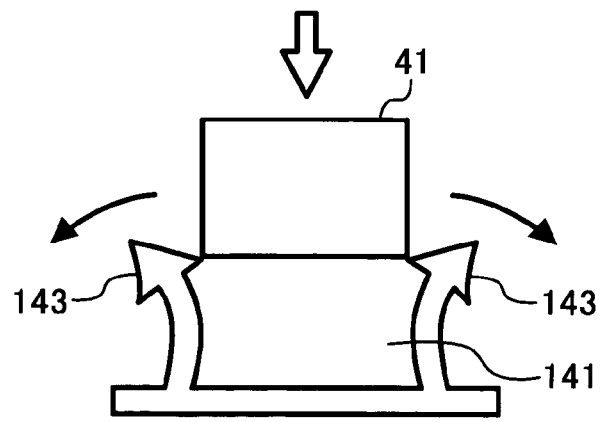
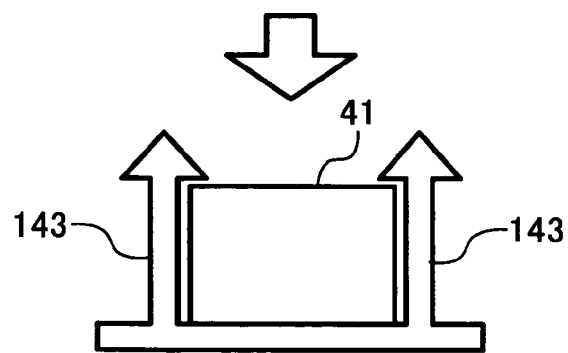

COVER FOR IMAGE FORMING APPARATUS TO FACILITATE PARTS RECYCLING

CROSS REFERENCE TO RELATED APPLICATION

This application claims priority to Japanese patent application nos. 2005-024664 filed on Feb. 1, 2005 and 2005-281327 filed on Sep. 28, 2005, the entire contents of each of which is hereby incorporated by reference herein.

BACKGROUND

In recent years, an increased concern on environmental issues propels copy machine manufactures to recover used copiers from customers, and to remove parts from used copiers to reuse such parts in a new copier.

Conventionally, removed parts are packed in a material handling container, which is prepared exclusively for recycling operations. However, a variety of material handling containers needs to be prepared to recover parts because a variety of parts are used in a copier. If types of material handling containers become too large to cope with recovery of a variety of parts, it is not preferable from a viewpoint of recovering cost.

Furthermore, copiers may be used in diverse environmental conditions because each customer may use a copier in unique environment. For example, an outer cover of a copier may be damaged severely in some cases depending on environmental conditions at customers or handling by collection traders. If a damage of the outer cover of the copier is too severe, such outer cover may not be reused.

If the damage of the outer cover of the copier is too severe, the outer cover may be crashed and melted to be reused as recycled raw material, which may be environmentally-friendly compared to just throwing away the outer cover.

However, in such recycling process, heat energy may be required to crash and melt the outer cover, thereby such recycling process may not be preferable from a viewpoint of energy saving.

In general, reuse of parts used in a machine has following difficulties: (1) transport cost of reuse parts, (2) complexity of management of reuse parts (e.g., material handling container management), (3) damages during transportation, and (4) others.

As for (1), a machine generally has a small number of parts which can be reused, and a number of to-be-recovered machines may not be predicted correctly in advance. Therefore, to cope with such uncertain recovery situations, material handling containers should be prepared in a relatively larger number, which is not preferable from a viewpoint of recovery cost.

As for (2), because a shipment of the to-be-recovered machines may not be predicted as described in the above (1), management of material handling containers cannot be conducted in an economical manner. For example, material handling containers may be overstocked with respect to number of to to-be-recovered machines at one time, or material handling containers may be understocked with respect to number of to to-be-recovered machines at other time. Thereby the management of reuse parts may become complex. Furthermore, recycle traders, which conducts recycling operations for reuse parts at a recycle center, are not necessarily familiar to parts, thereby they may conduct unfavorable operations such as picking-up of wrong parts when they conduct a recycling process.

As for (3), in general, material handling containers provide good protection for parts from a hazard such as shock and vibration. However, such good protection can be achieved if only protection member such as shock absorber or lining is properly used. If such protection member is not properly used, damages may happen during transportation of parts even if the material handling containers are used.

As for (4), reuse parts in a machine may be damaged due to shock, which may happen by a collision of machines having not-enough strength for the outer cover of machines.

Under such situations, a process for recovering reuse parts with less complex management system has been desired to reduce parts recovery cost.

In case of an outer cover for covering an image forming apparatus such as copier, the outer cover has an inner surface provided with a plurality of ribs to keep strength of the outer cover.

For example, in case of a front cover of an image forming apparatus, which is pivotably opened, the front cover has following ribs: (1) relatively narrow and higher ribs formed near a pivot area such as hinge area, which receives a greater force, to keep strength of the outer cover, and (2) relatively broad and smaller ribs formed at an area such as hand-held portion for opening the cover, which is far from the pivot area such as hinge area, to keep necessary strength for a torsion force on such area while giving some flexibility, wherein the hand-held portion can be hold by hand without feeling a difficulty with such flexibility.

When an image forming apparatus is recovered from customers, an operator removes an outer cover (made of resin, for example) and parts (made of metal, for example) from the image forming apparatus.

At first, the operator opens a cover of the image forming apparatus, removes removable units, and picks up parts from the inside of the image forming apparatus. Then the operator selects recyclable parts and non-recyclable parts. The recyclable parts are then cleaned, checked, and installed in a new apparatus.

Many recyclable parts and non-recyclable parts are unique to each type of apparatuses, and furthermore, an installation layout of parts is also unique to each type of apparatuses. Therefore, the operator needs to memorize part-layout and pick-up procedure for each apparatus, or to look up a pick-up procedure for each apparatus when conducting recycle operations.

Therefore, the operator needs to handle a variety of apparatuses for recycling operations under an environment, which is different from an environment of manufacturing a same new apparatus in a factory.

If the operator needs to look up a pick-up procedure manual for each apparatus, such operator cannot conduct recycling operations efficiently. However, the operator needs some time (or experiences) to memorize pick-up procedure manuals for each apparatus if he wants to conduct recycling operations without looking up the pick-up procedure manuals.

Furthermore, not all parts are removed from an apparatus but only some parts are removed from the apparatus.

Under such complex situation, the operator may forget to pick up to-be-picked up parts or may pick up wrong parts even if the operator looks up pick-up procedure manuals for recycling operations. The operator may also forget to pick up to-be-picked up parts or may pick up wrong parts if he conducts recycling operations with his memory of pick-up procedure manuals for recycling operations because he may confuse a variety of pick-up procedure manuals. Furthermore, the operator may not have enough knowledge which part is recyclable or non-recyclable.

SUMMARY

An example embodiment of the present disclosure relates to a cover for use in an apparatus, e.g., an image forming apparatus. Such a cover, e.g., can facilitate parts recycling. Such a cover includes a plate and at least one rib. The plate has an inner surface, and the at least one rib is formed on the inner surface of the plate to define one or more compartments. Each compartment is configured to receive a corresponding part removed from the apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a schematic perspective view of a rib of an outer cover according to another example embodiment;

FIG. 6 is a schematic view explaining an effect of a rib in FIG. 5;

DETAILED DESCRIPTION OF EXAMPLE EMBODIMENTS

Figure 1A:
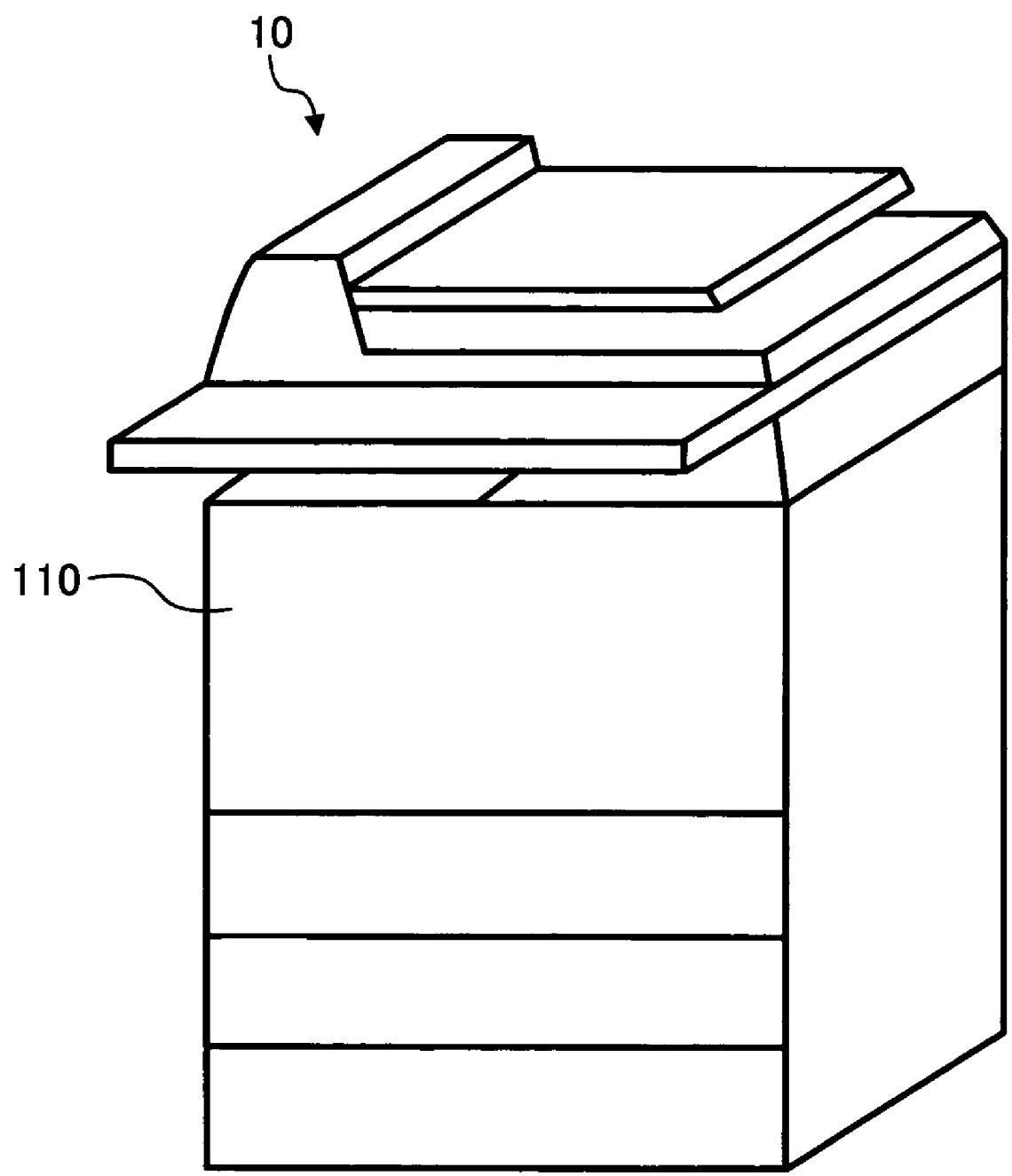
FIG. 1A is a schematic perspective view of an image forming apparatus according to an example embodiment.

In describing example embodiments shown in the drawings, specific terminology is employed for the sake of clarity. However, the disclosure of this present invention is not intended to be limited to the specific terminology so selected and it is to be understood that each specific element includes all technical equivalents that operate in a similar manner.

Referring now to the drawings, wherein like reference numerals designate identical or corresponding parts throughout the several views, an image forming apparatus according to an example embodiment is described with reference to FIG. 1.

Hereinafter, an image forming apparatus 10 in FIG. 1A according to an example embodiment is explained. The image forming apparatus 10 can be used for color image forming, for example.

As shown in FIG. 1A, the image forming apparatus 10 includes an outer cover (also known as a door or lid) 110.

Figure 1B:
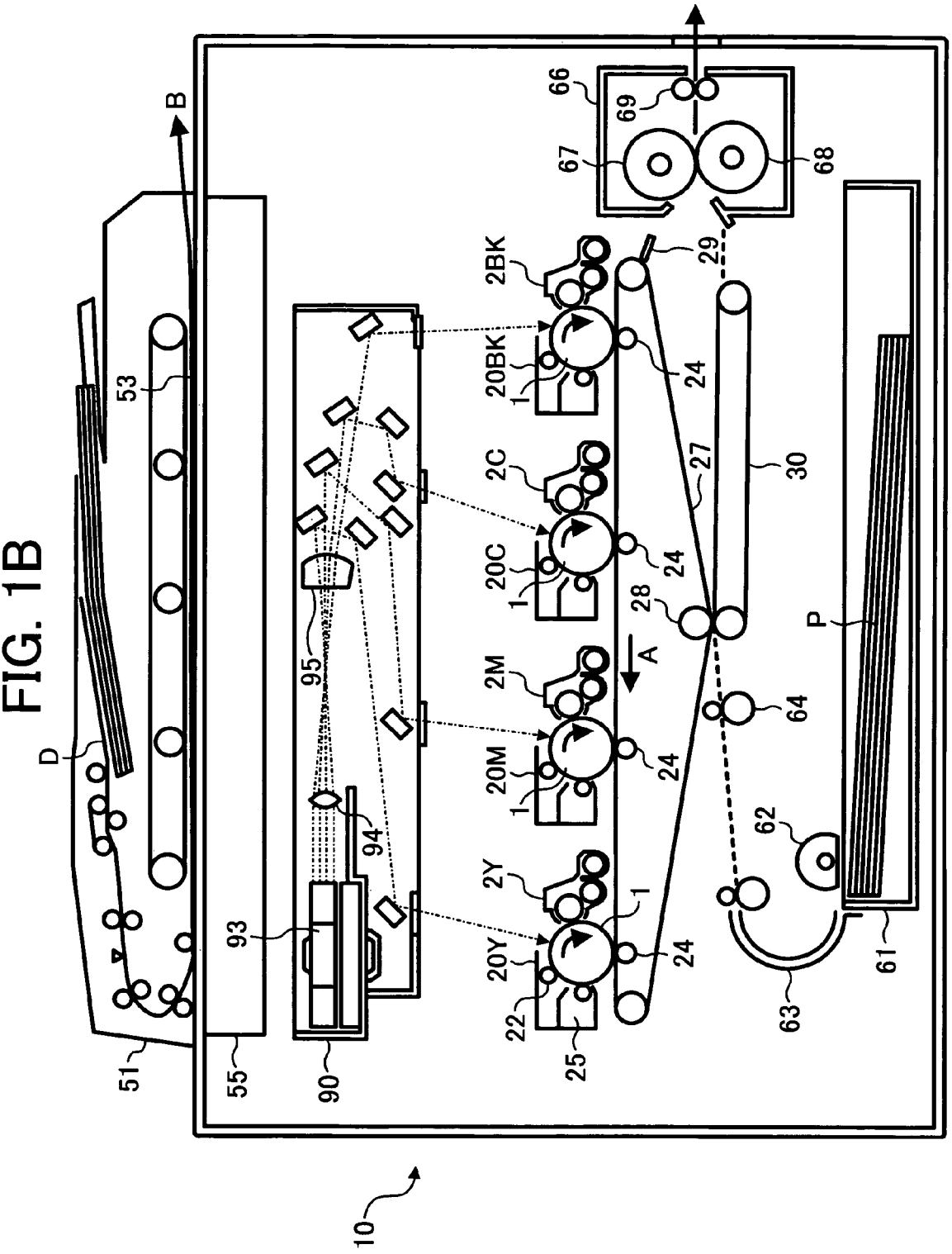
FIG. 1B is a schematic sectional view of an image forming apparatus in FIG. 1A.

As shown in FIG. 1B, the image forming apparatus 10 includes an optical writing unit 90, process cartridges 20Y, 20M, 20C, and 20BK, a photosensitive member 1, a charge unit 22, developing apparatuses 2Y, 2M, 2C, and 2BK, a first transfer bias roller 24, a cleaning unit 25, an intermediate transfer belt 27, a second transfer bias roller 28, an transfer belt cleaning unit 29, a transport belt 30, a document feed unit 51, a scanner 55, a sheet feed unit 61 for storing a recording medium P, and a fixing unit 66.

The optical writing unit 90 emits a laser beam corresponding to image information, input into the image forming apparatus 10. The photosensitive member 1 is included in each of the process cartridges 20Y, 20M, 20C, and 20BK as image carrying member. The charge unit 22 charges a surface of the photosensitive member 1. Each of the developing apparatuses 2Y, 2M, 2C, and 2BK develops an electrostatic latent image formed on the photosensitive member 1 as toner image. The first transfer bias roller 24 transfers the toner image from the photosensitive member 1 to the intermediate transfer belt 27, on which a plurality of different toner images are superimposingly transferred.

The cleaning unit 25 recovers toners remained on the photosensitive member 1 after transferring the toner image from the photosensitive member 1 to the intermediate transfer belt 27. The second transfer bias roller 28 transfers the toner image on the intermediate transfer belt 27 to the recording medium P. The transfer belt cleaning unit 29 recovers toners remained on the intermediate transfer belt 27 after transferring the toner image from the intermediate transfer belt 27 to the recording medium P. The transport belt 30 transports the recording medium P having the toner image thereon. The document feed unit 51 transports a document D to the scanner 55. The scanner 55 scans image information of the document D. The sheet feed unit 61 stores the recording medium P such as transfer sheet, for example. The fixing unit 66 fixes the toner image on the recording medium P.

An image forming for each color of yellow, magenta, cyan, and black is conducted on the photosensitive member 1 included in each of the process cartridges 20Y, 20M, 20C, and 20BK.

Hereinafter, a color image forming to be conducted in the image forming apparatus 10 is explained.

At first, the document feed unit 51 transports the document D on a document tray in a direction shown by an arrow B in FIG. 1 by a transport roller, and is placed on a contact glass 53 of the scanner 55. The scanner 55 optically scans image information of the document D. For example, the scanner 55 scans the image of the document D placed on the contact glass 53 by irradiating light emitted from a light source (not shown). The light reflected on the document D is focused on a color sensor via mirrors and lenses.

The color image information of the document D is read by the color sensor for each color of red, green, and blue (RGB), and converted into electrical signals for each of RGB. An image processing unit (not shown) conducts processing such as color conversion, color correction, and space frequency correction to the electrical signals for each of RGB to generate image data for yellow, magenta, cyan, and black.

The image data for yellow, magenta, cyan, and black is then transmitted to the optical writing unit 90. The optical writing unit 90 emits a laser beam corresponding to the respective color image data to the photosensitive member 1 included in each of process cartridges 20Y, 20M, 20C, and 20BK.

As shown in FIG. 1B, the photosensitive member 1 rotates in a clockwise direction, for example. The charge unit 22 uniformly charges the surface of the photosensitive member 1.

Then the charged surface of the photosensitive member 1 comes to a position to be irradiated by a laser beam emitted from the optical writing unit 90.

As above-mentioned, the optical writing unit 90 emits a laser beam corresponding to the respective image data for yellow, magenta, cyan, and black.

The laser beam, entered and reflected from a polygon mirror 93, passes through lenses 94 and 95.

After passing through the lenses 94 and 95, the laser beam is split into a plurality of laser beams for each of yellow, magenta, cyan, and black image, and such split laser beam is led to respective light path for each of yellow, magenta, cyan, and black image.

A laser beam for yellow image is reflected at mirrors, and then irradiated on the surface of the photosensitive member 1 in the process cartridge 20Y.

The laser beam for yellow image is scanned to a main scanning direction of the photosensitive member 1 by rotating the polygon mirror 93 in a high speed.

Then, the charge unit 22 charges the surface of the photosensitive member 1 to form an electrostatic latent image for yellow image on the photosensitive member 1.

In a similar manner, a laser beam for magenta image is reflected at mirrors, and then irradiated on the surface of the photosensitive member 1 in the process cartridge 20M to form an electrostatic latent image for magenta image on the photosensitive member 1.

In a similar manner, a laser beam for cyan image is reflected at mirrors, and then irradiated on the surface of the photosensitive member 1 in the process cartridge 20C to form an electrostatic latent image for cyan image on the photosensitive member 1.

In a similar manner, a laser beam for black image is reflected at a mirror, and then irradiated on the surface of the photosensitive member 1 in the process cartridge 20BK to form an electrostatic latent image for black image on the photosensitive member 1.

Then, the surface of the photosensitive member 1 in the process cartridges 20Y, 20M, 20C, and 20BK comes to a position facing the respective developing apparatuses 2Y, 2M, 2C, and 2BK.

Each of the developing apparatuses 2Y, 2M, 2C, and 2BK supplies respective color toner to the respective surface of the photosensitive member 1 in the process cartridges 20Y, 20M, 20C, and 20BK to develop the electrostatic latent image on the photosensitive member 1 as toner image.

After such developing process, the surface of the photosensitive member 1 in the respective process cartridges 20Y, 20M, 20C, and 20BK comes to a position facing the intermediate transfer belt 27.

As shown in FIG. 1B, the first transfer bias roller 24, provided on an inner surface of the intermediate transfer belt 27, faces such position via the intermediate transfer belt 27.

The first transfer bias roller 24 transfers the color toner images formed on the photosensitive member 1 in the respective process cartridges 20Y, 20M, 20C, and 20BK to the intermediate transfer belt 27 by superimposing the color toner images on the intermediate transfer belt 27.

After transferring the color toner images to the intermediate transfer belt 27, the surface of the photosensitive member 1 comes to a position facing the cleaning unit 25. The cleaning unit 25 recovers toners remained on the photosensitive member 1.

Then, a de-charging unit (not shown) de-charges the surface of the photosensitive member 1.

A series of image forming process for the photosensitive member 1 is completed as such.

The intermediate transfer belt 27 having the color toner images thereon travels in a direction shown by an arrow A and comes to a position at the second transfer bias roller 28.

Then, the color toner images are transferred from the intermediate transfer belt 27 to the recording medium P at the position of the second transfer bias roller 28.

After transferring the color toner images, the intermediate transfer belt 27 comes to a position facing the transfer belt cleaning unit 29. The transfer belt cleaning unit 29 recovers toners remained on the intermediate transfer belt 27.

A series of transfer process for the intermediate transfer belt 27 is completed as such.

The recording medium P fed to the position of the second transfer bias roller 28 is transported from the sheet feed unit 61 through a transport guide 63, and pair of registration rollers 64.

For example, the recording medium P stored in the sheet feed unit 61 is fed to the transport guide 63 by a feed roller 62, and further guided to the pair of registration rollers 64 through the transport guide 63.

After the recording medium P reaches the pair of registration rollers 64, the recording medium P is fed to the position of the second transfer bias roller 28 by adjusting a feed timing with toner image formation on the intermediate transfer belt 27.

Then, the recording medium P is transported to the fixing unit 66 by the transport belt 30.

The fixing unit 66 includes a heat roller 67 and a pressure roller 68, which form a nip therebetween. The color toner images are fixed on the recording medium P at the nip.

After such fixing process, the recording medium P is ejected to an outside of the image forming apparatus 10 by the sheet ejection roller 69.

In the above-described manner, a series of image forming process in the image forming apparatus 10 is completed.

Figure 2:
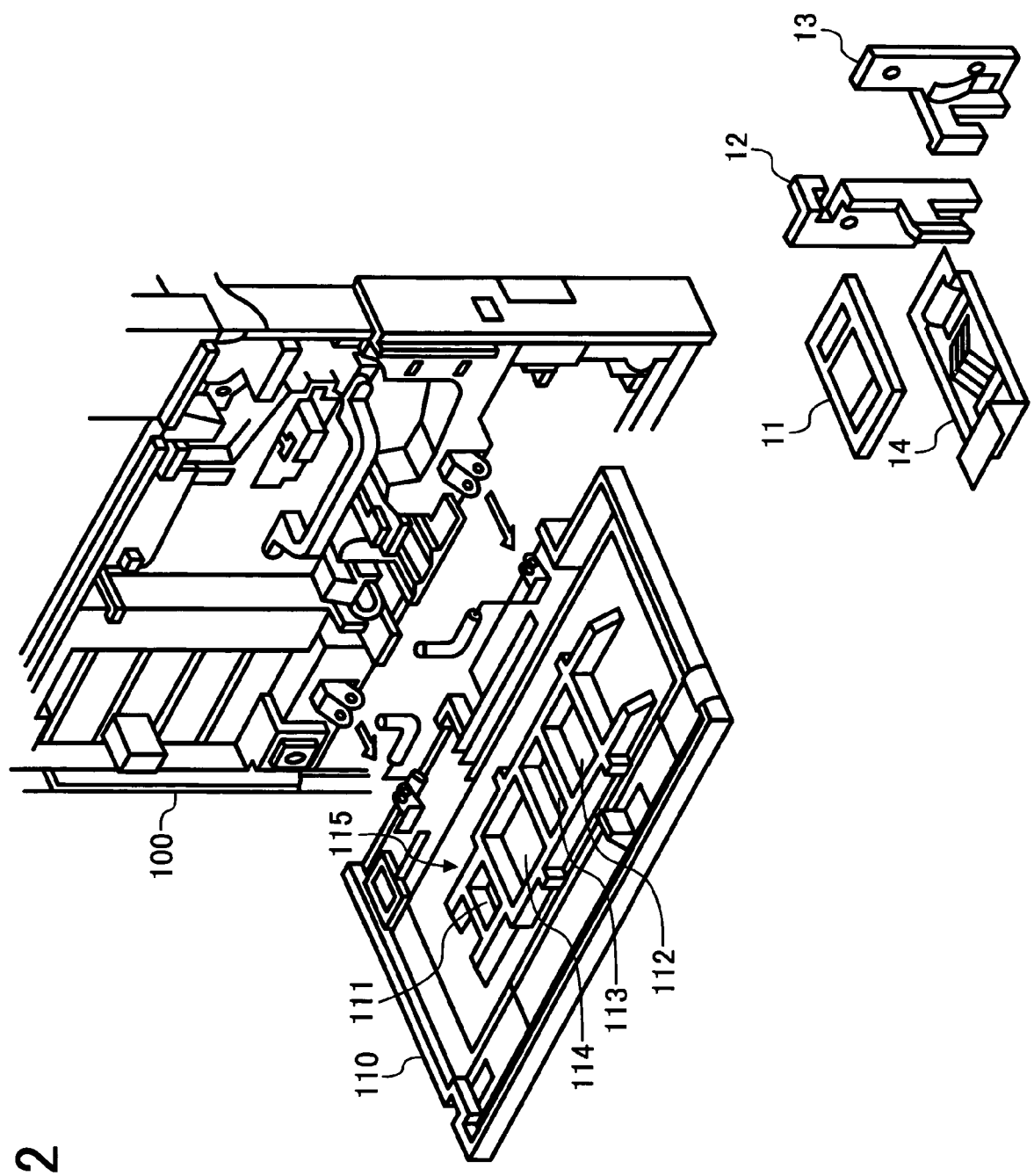
FIG. 2 is a schematic perspective view of an outer cover of an image forming apparatus in FIG. 1A.
Figure 3:
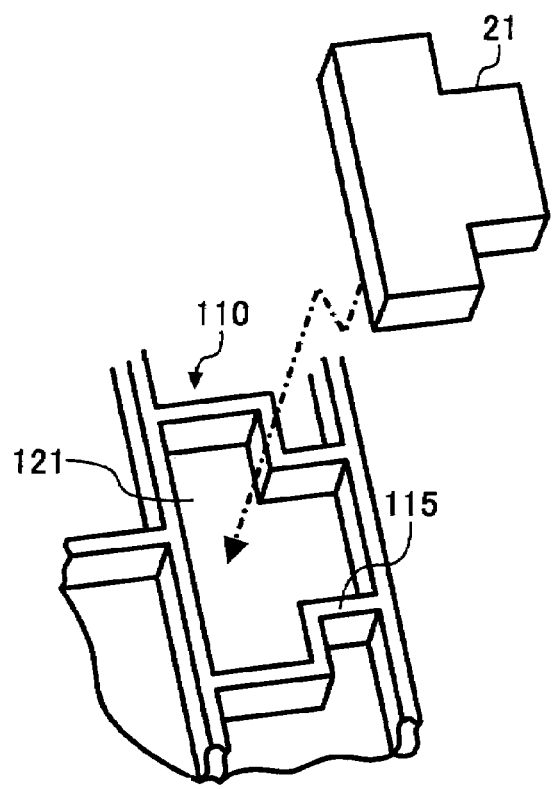
FIG. 3 is a partially expanded view of an outer cover in FIG. 2.
Figure 4:
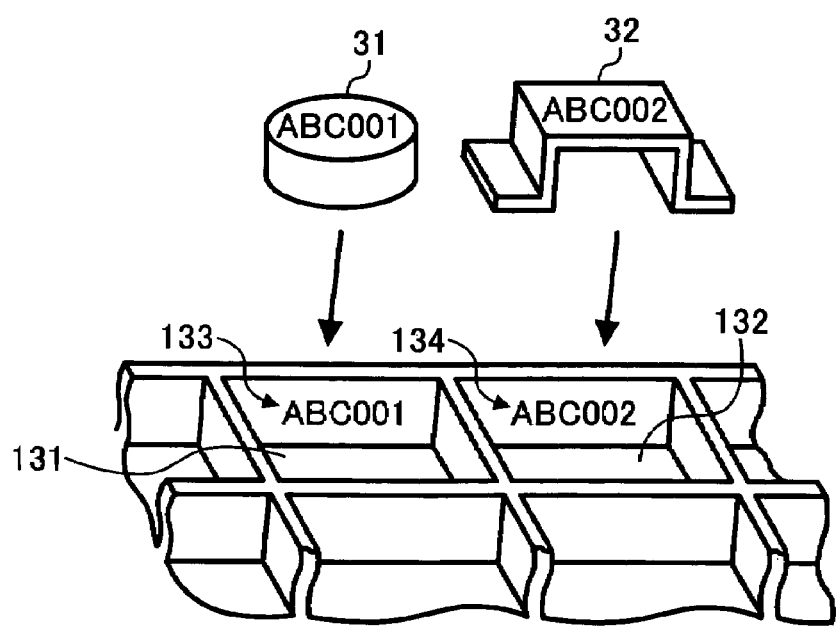
FIG. 4 is another partially expanded view of an outer cover in FIG. 2.

Hereinafter, the outer cover 110 of the image forming apparatus 1 is explained in detail with reference to FIGS. 2 to 4, wherein FIG. 2 is a schematic perspective view of an outer cover of the image forming apparatus 10, FIG. 3 is a partially expanded view of an outer cover in FIG. 2, and FIG. 4 is another partially expanded view of an outer cover in FIG. 2.

In example embodiment, the image forming apparatus 10 includes an apparatus body 100 and the outer cover 110 as shown in FIG. 2.

The outer cover 110 can be attached to the apparatus body 100 with a pivotable connector such as hinge so that the outer cover 110 can be opened and closed with respect to the apparatus body 100. The outer cover 110 can be opened and closed in a vertical or horizontal direction with respect to the apparatus body 100.

The outer cover 110 is configured to be opened and closed as above-mentioned to conduct pick-up operations for parts in the apparatus body 100.

In general, other outer covers provided next to the outer cover 110 such as right, left, and rear side are fixed to the apparatus body 100 with a fixing member such as screw, for example.

In example embodiment, the outer cover 110 has reinforcement ribs 115 on its inner surface, wherein the inner surface of the outer cover 110 is not seen from a user when the outer cover 110 is closed to the apparatus body 100.

The reinforcement ribs 115 are provided on the outer cover 110 to maintain strength of the outer cover 110. As shown in FIG. 2, the reinforcement ribs 115 run across each other and define a plurality of one or more compartments or receptacles (hereafter, sections).

For example, the reinforcement ribs 115 define reuse part storing sections 111, 112, 113, and 114. In other words, the reinforcement ribs 115 configure a shape that includes the reuse part storing sections 111, 112, 113, and 114.

The reuse part storing sections 111, 112, 113 formed by the reinforcement ribs 115 preferably have a width and length of approximately 30 mm to 40 mm, for example.

Reuse parts 11, 12, 13, and 14 include any parts such as electric parts (e.g., motor), and such reuse parts 11, 12, 13, and 14 can be fit in the reuse part storing sections 111, 112, 113, and 114, respectively.

In example embodiment, a number of reuse parts and a number of reuse part storing sections are matched one by one, thereby an operator may not forget to pick-up reuse parts which should be picked up.

If the number of reuse part storing sections is larger than the number of reuse parts, extra reuse part storing sections can be used as extra storing section.

In example embodiment, the reuse parts 11, 12, 13, and 14 are recovered and then placed in the reuse part storing sections 111, 112, 113, and 114, respectively when a recycle operation is conducted for the image forming apparatus 10.

In example embodiment, as shown in FIG. 3, a reuse part storing section 121 defined by the reinforcement ribs 115 on the outer cover 110 is formed into a shape which can fit to a shape of a reuse part 21 without a significant gap between the reuse part 21 and the reuse part storing section 121. In other words, the shapes of the reuse part store section 121 and the reuse part 21 are substantially complementary.

Furthermore, as shown in FIG. 4, the outer cover 110 includes reuse part storing sections 131 and 132, which can store reuse parts 31 and 32, respectively.

As shown in FIG. 4, an identification information of part such as name and serial number is attached on the reuse part storing sections 131 and 132, and the corresponding reuse parts 31 and 32. Such information is shown as indications 133 and 134, wherein the indications 133 and 134 can be attached to the reuse part storing sections 131 and 132 with a method such as marking seal, direct printing, and die-cut.

With such indications 133 and 134, an operator can easily identify which reuse parts should be stored in which storing section.

The reinforcement ribs 15 are generally composed of a plurality of straight lines, which cross each other.

However, the reinforcement ribs 15 can be composed of a plurality of non-straight lines, which can fit to shapes of reuse parts. Furthermore, if the reinforcement ribs 15 are composed of non-straight lines, the shape defined by the reinforcement ribs 15 may become more complex, wherein such complex shape can increase strength of the reinforcement ribs 15.

FIG. 5 is another reinforcement rib of an outer cover according to another example embodiment, in which a drop-prevention mechanism is provided to a reuse part storing section 141 for fitting a reuse part 41.

A shown in FIG. 5, a reinforcement rib 142 includes a pair of cuts 144, and a stopper 143, wherein the stopper 143 is formed between the pair of cuts 144, and the stopper 143 has a claw-like shape on its top portion.

When the reuse part 41 is inserted in the reuse part storing section 141, the two stoppers 143 may swing toward outside as shown in FIG. 6, and the reuse part 41 fits into the reuse part storing section 141.

When the reuse part 41 fits into the reuse part storing section 141, the two stoppers 143 return to an original shape with an effect of elasticity of the two stoppers 143. With such configuration, the reuse part 41 can be fixed in the reuse part storing section 141 as shown in FIG. 6.

As above-described, the outer cover can be used for transporting and storing parts. Therefore, a special material handling container is not required to transport and store parts, thereby a recycling cost for image forming apparatuses can be reduced.

As above-described, an operator may not forget to pick-up reuse parts, which should be picked up, because a number of reuse parts and a number of reuse part storing sections can be matched one by one. If the number of reuse part storing sections is larger than the number of reuse parts, extra reuse part storing sections can be used as extra storing sections.

Furthermore, the reuse part storing sections are provided with identification information of reuse parts such as name and serial number by a method such as die-cut, thereby an operator may not forget to pick up the reuse parts, which should be picked up. Therefore, the operator can easily arrange the reuse parts in the outer cover.

Furthermore, the reuse part storing sections can be formed in shapes similar to shapes of the reuse parts, by which the operator may not forget to pick up parts. And such shapes of the reuse part storing sections can hold the reuse parts in a predetermined direction and position, thereby a damage of the reuse parts due to vibration during transportation can be prevented.

As also described in the above, the reuse part storing sections include a drop-prevention mechanism for the reuse parts, thereby a damage of the reuse parts due to vibration or drop during transportation can be prevented.

Figure 7:
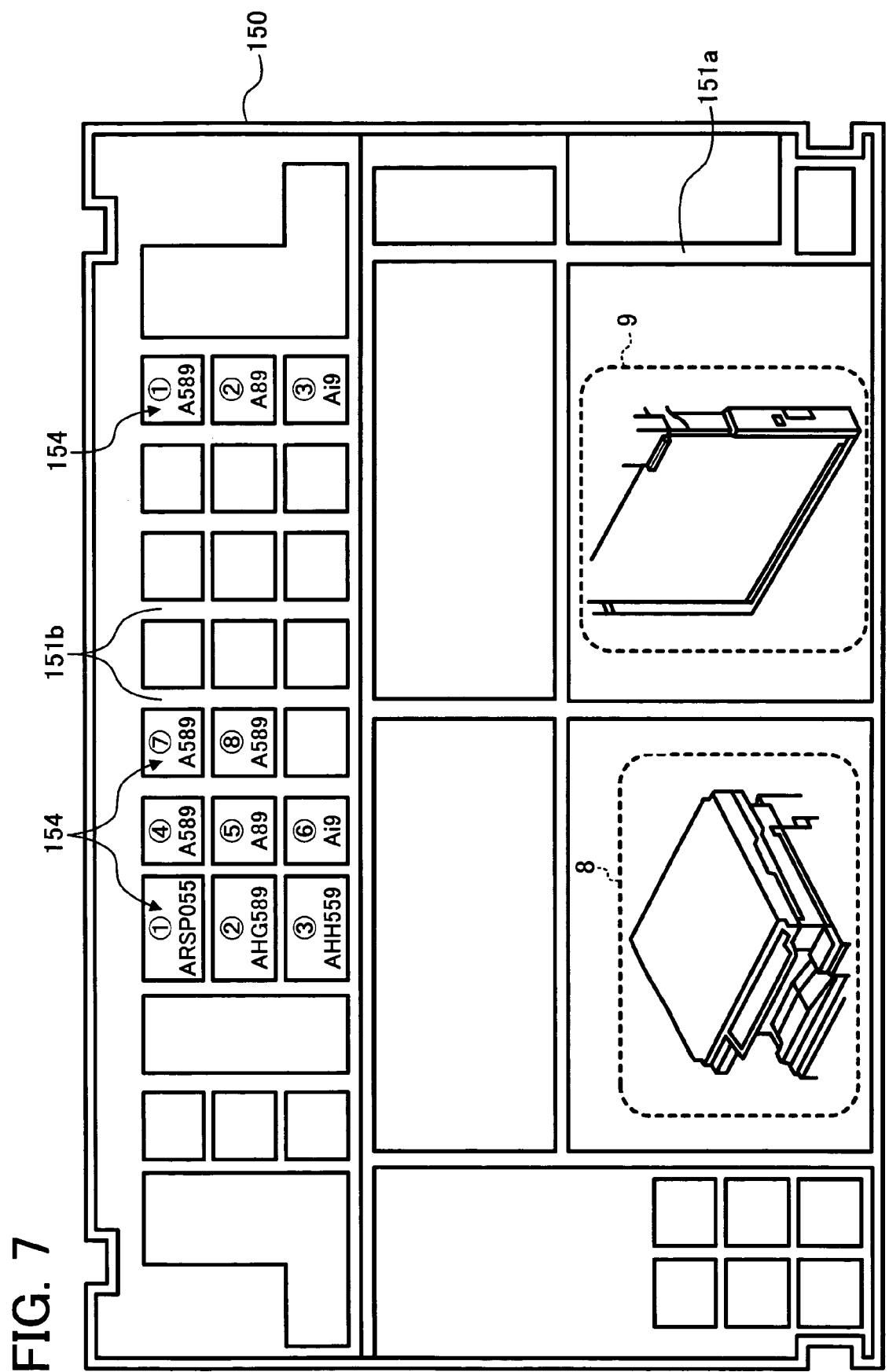
FIG. 7 is a schematic plan view of another outer cover of an image forming apparatus according to another example embodiment, in which an inner surface of the outer cover is shown.

FIG. 7 is a schematic plan view of another outer cover of an image forming apparatus according to another example embodiment, in which an inner surface of the outer cover is shown.

In another example embodiment, an operator pick up parts from the image forming apparatus by looking a part-layout view, or a pick-up sequence information and serial number provided on the outer cover.

Hereinafter, an outer cover 150 according to another example embodiment is explained in detail.

As shown in FIG. 7, the outer cover 150 has an inner surface in which ribs 151a and 151b are formed. The outer cover 150 can be attached to the apparatus body 100 of the image forming apparatus 10 at an upper side of the outer cover 150 with a hinge, for example.

Figure 8:
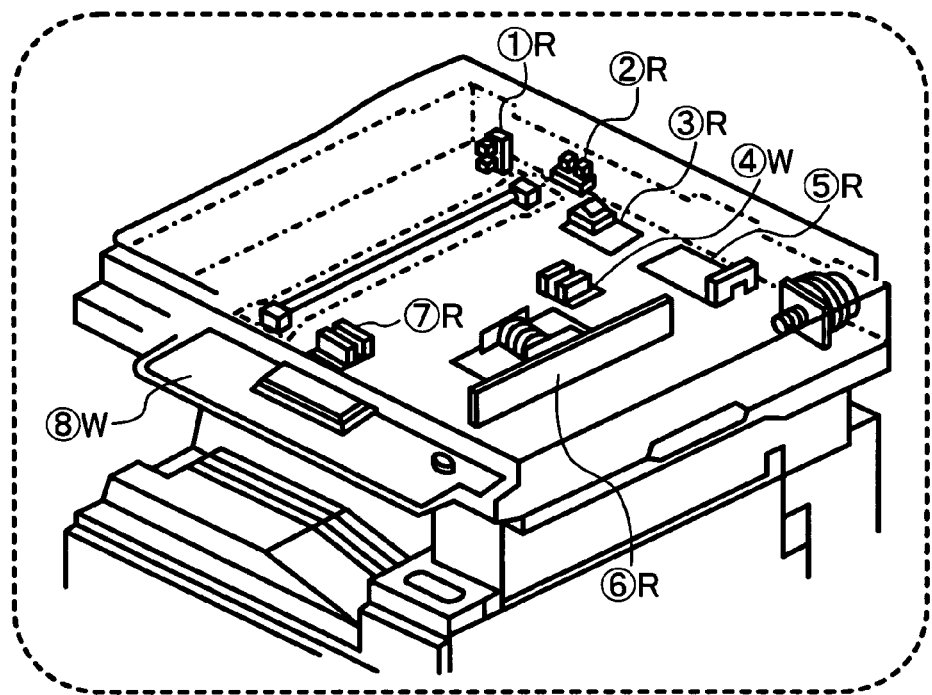
FIG. 8 is an expanded view of an inner surface of an outer cover in FIG. 7.

In a lower side of the outer cover 150 in FIG. 7, relatively larger sections defined by the rib 151a are provided to place part-layout views 8 and 9. FIG. 8 shows an expanded view of the part-layout view 8, and FIG. 9 shows an expanded view of the part-layout view 9.

Each of the part-layout views 8 and 9 teaches which part should be removed and which part should be recycled. For example, if a part should be recycled, it is labeled as "R," and if a part should be discarded, it is labeled as "W."

Figure 9:
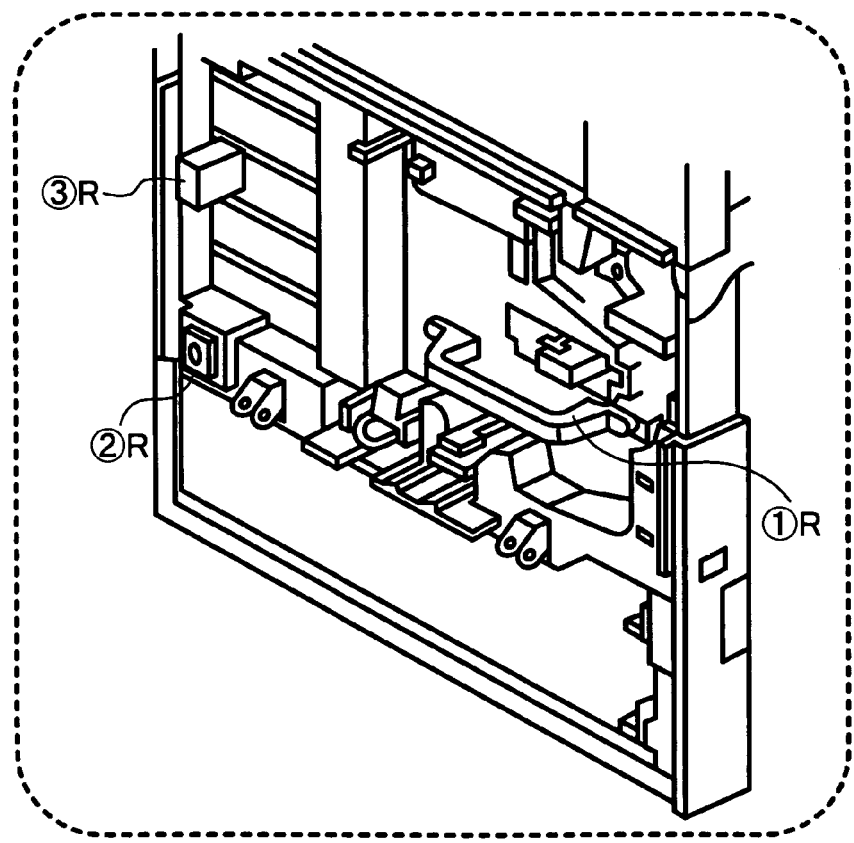
FIG. 9 is another expanded view of an inner surface of an outer cover in FIG. 7.

Furthermore, as shown in FIGS. 7 to 9, numbers such as 1, 2, and 3 visually indicate pick-up sequence information of parts so that an operator can easily understand a sequence of pick-up procedure of the parts.

As shown in FIGS. 7 to 9, the part-layout view 8 teaches parts to be picked up from a scanner (not shown) area, and the part-layout view 9 teaches parts to be picked up from the outer cover 150 area.

In example embodiment, the outer cover 150 stores the parts at the outer cover 150 area and the parts for the scanner area, thereby the inner surface of the outer cover 150 have the part-layout view 8 for the scanner (not shown) area and the part-layout view 9 for the outer cover 150 area.

On one hand, reuse part storing sections formed by the relatively smaller ribs 151b are provided in the upper side (or hinge side) of the outer cover 150 as shown in FIG. 7.

As shown in FIG. 7, the reuse part storing sections include a pick-up sequence indication 154 which correspond to a pick-up sequence indication on the part-layout views 8 and 9, wherein the pick-up sequence indication 154 shows a pick-up sequence of parts.

Furthermore, the reuse part storing sections include serial numbers for each part in advance in a similar manner as in the reuse part storing sections 131 and 132 in FIG. 4, which store reuse parts 31 and 32, respectively.

In order to prevent confusion and mixing of parts for the outer cover 150 area and the scanner area when the parts are picked up, the parts for outer cover 150 area can be arranged and stored in proximity of the part-layout view 9, and the parts for the scanner area can be arranged and stored in proximity of the part-layout view 8.

With such configuration to prevent confusion of parts, the reuse part storing sections can store the parts for outer cover 150 area and parts for the scanner area in an orderly manner.

The above-mentioned indications such as pick-up sequence indication 154 can be formed on the outer cover 150 by providing convexed and concaved portions on the outer cover 150. With such method, even if the outer cover 150 is melted for recycling, impurities may not be included in recycled parts.

The reuse part storing sections and the part-layout views 8 and 9 are formed on the outer cover 150 with considering shape and arrangement of ribs 151a and 151b that can satisfy usability and product quality such as mechanical strength.

Therefore, the shapes of the ribs 151a and 151b are preferably determined by considering strength of the outer cover 150 and operability of the pick-up procedure of parts.

If the product quality (e.g., mechanical strength) of the outer cover 150 can be secured, the ribs 151a and 151b can take any shapes, wherein such shapes include a shape that matches to a shape of the part as shown in FIG. 3.

The operator picks up parts from the image forming apparatus by checking the above-mentioned part-layout views 8 and 9 on the inner surface of the outer cover 150, and puts the parts to the corresponding reuse part storing sections on the outer cover 150.

With such procedure, parts can be picked up in an orderly manner, and the picked-up parts can be stored in the reuse part storing sections, thereby the operator may not forget to pick up parts that should be picked up.

Furthermore, the operator can check serial number on the part and corresponding serial number on the reuse part storing sections, thereby the operator may not pick up wrong parts.

Furthermore, because the outer cover is unique to each apparatus, the outer cover can be used for a recycled apparatus. Accordingly, the above-described pick-up procedure can be conducted to a recycled apparatus when recycling the recycled apparatus.

Figure 10:
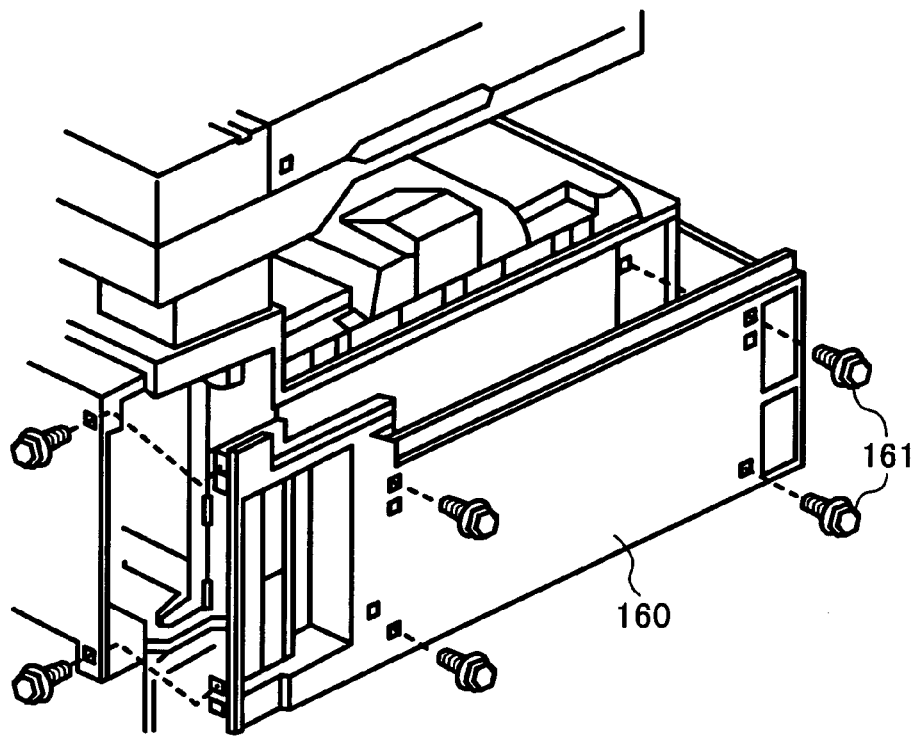
FIG. 10 is a perspective view of another outer cover of an image forming apparatus according to another example embodiment.

FIG. 10 is a perspective view of another outer cover of an image forming apparatus according to another example embodiment.

Figure 11:
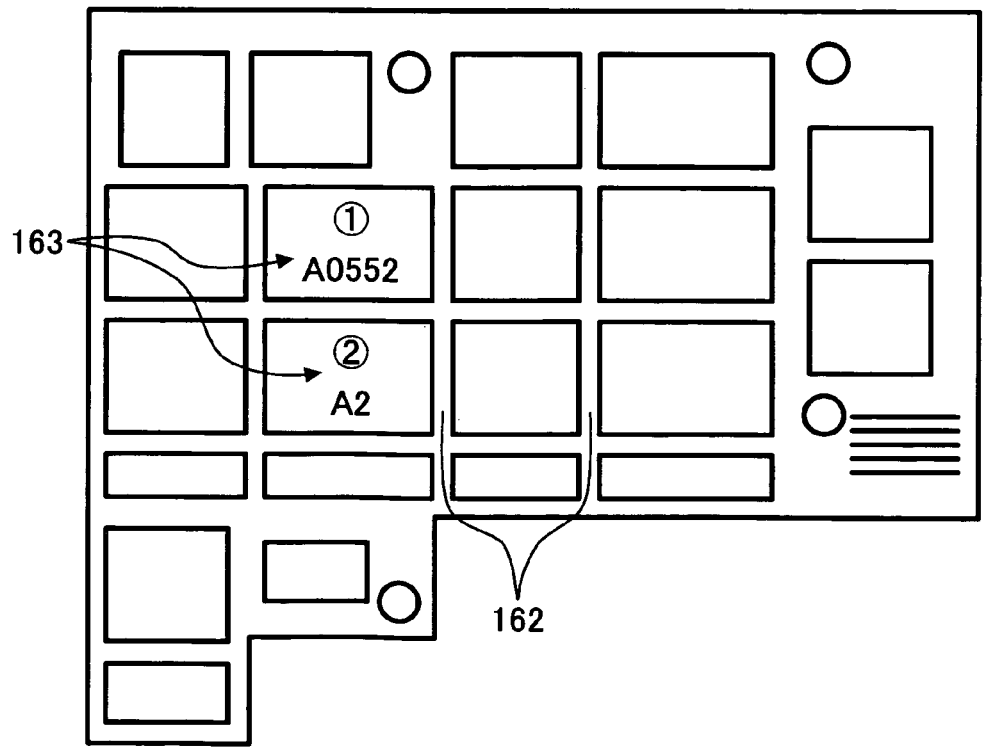
FIG. 11 is a plan view of an inner surface of an outer cover in FIG. 10.

As shown in FIG. 10, fixing members 161 such as bolt and screw can be loosened to remove a cover 160 from the image forming apparatus. As shown in FIG. 11, the cover 160 has an inner surface having a rib 162.

If the cover 160 has no relatively larger section, which can be defined by the rib 162, a part-layout view may not be provided due to such limited space. In such a case, a pick-up sequence indication 163 can be provided on the inner surface of the cover 160 as shown in FIG. 11. The pick-up sequence indication 163 indicates pick-up sequence, serial number, and recycle-ability of parts, for example.

The operator can use the pick-up sequence indication 163 on the inner surface of the cover 160 to conduct pick-up procedure of parts.

In example embodiment shown in FIG. 11, the pick-up sequence indication 163 and the reuse part storing sections are provided on the inner surface of the cover 160 as one example for information indication method. Other information indication method can be provided, as required.

Furthermore, an outer cover can be made as an apparatus-unique product or a universal product, wherein the universal product can be used among a plurality of apparatuses.

In case of using the outer cover as universal product, recyclable parts may be designed as common parts for a plurality of apparatuses in advance, and a common part-layout is used for the plurality of apparatuses. With such configuration, a same outer cover can be used for recovering parts in the plurality of apparatuses.

In example embodiment, the reuse part storing section 121 are provided with the pick-up sequence and the serial number.

However, the reuse part storing section 121 can be provided with the pick-up sequence information without serial number. In such a case, the reuse part storing section 121 is formed into a shape which matches to a shape of part to be picked up. For example, refer to the reuse part 21 in FIG. 3.

Furthermore, information, which indicates recyclable part and non-recyclable part, can be provided to the reuse part storing section 121, for example.

In the above-described example embodiments, the outer cover is used with an image forming apparatus such as copier. However, the above-described outer cover can be used with any kinds of apparatus, which is required to be recycled. Such apparatus may include an electronic apparatus such as computer and printer, for example.

Numerous additional modifications and variations are possible in light of the above teachings. It is therefore to be understood that within the scope of the appended claims, the disclosure of the present invention may be practiced otherwise than as specifically described herein.

What is claimed is:

1. A cover for use in an image forming apparatus, the cover comprising:
    a plate pivotally attached to a body of the image forming apparatus, the plate having an inner surface; and
    at least one rib, formed on the inner surface of the plate and arranged to define at least one part storage compartment, each part storage compartment being configured to receive a part removed from the image forming apparatus, wherein
    the removed part is a part that is to be reused,
    the at least one part storage compartment includes a drop-prevention mechanism, formed integrally with the rib, that retains a part of the image forming apparatus in the at least one part storage compartment, and
    wherein the cover is removably attached to the image forming apparatus and is configured as a transporting device for transporting at least one part removed from the image forming device.

2. The cover according to claim 1, wherein a number of part storage compartments is equal to a number of parts removed from the image forming apparatus.

3. The cover according to claim 1, wherein a number of part storage compartments is greater than a number of the parts removed from the image forming apparatus.

4. The cover according to claim 1, wherein the at least one part storage compartment is provided with at least one of a name and an identification number of the parts removed from the apparatus.

5. The cover according to claim 1, wherein the at least one part storage compartment is formed into a shape corresponding to a shape of a part of the image forming apparatus.

6. The cover according to claim 1, wherein a plurality of part storage compartments are shape coded in a predetermined configuration corresponding to a predetermined part layout.

7. A cover for use in an image forming apparatus, the cover comprising:
- a plate pivotally attached to a body of the image forming apparatus, the plate having an inner surface; and
- at least one rib, formed on the inner surface of the plate and arranged to define at least one part storage compartment, each part storage compartment being configured to receive a part removed from the image forming apparatus, wherein the at least one rib includes a pair of parallel cuts formed in the at least one rib and a stopper formed between the cuts, the stopper having an enlarged portion that extends transversely above the at least one rib.

8. The cover according to claim 7, wherein the stopper is elastically flexible in a direction transverse to the at least one rib.

9. An image forming apparatus, comprising:
- a body configured to hold parts therein at least some of which are cooperable to form images; and
- a cover pivotally attached to the image forming apparatus, the cover including;
  - a plate having an inner surface; and
  - at least one rib formed on the inner surface of the plate and arranged to define one or more compartments, each compartment being configured to receive a part removed from the apparatus, wherein the at least one rib includes a pair of parallel cuts formed in the at least one rib and a stopper formed between the cuts, the stopper having an enlarged portion that extends transversely above the at least one rib.

* * * * *